March 28, 1967     A. SABATINO     3,311,509
METHOD OF SEALING INTERCELL BATTERY CONNECTIONS
Filed May 28, 1964
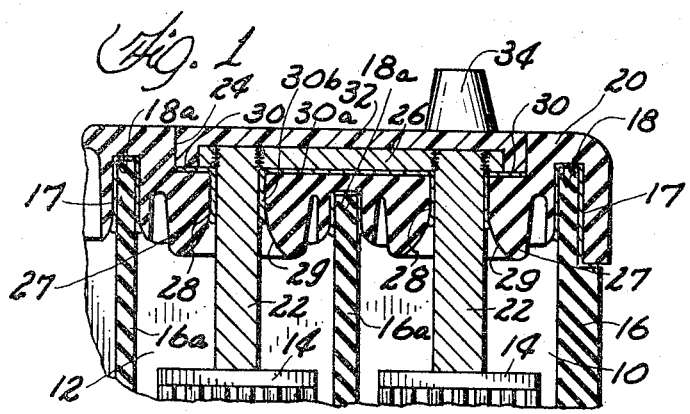
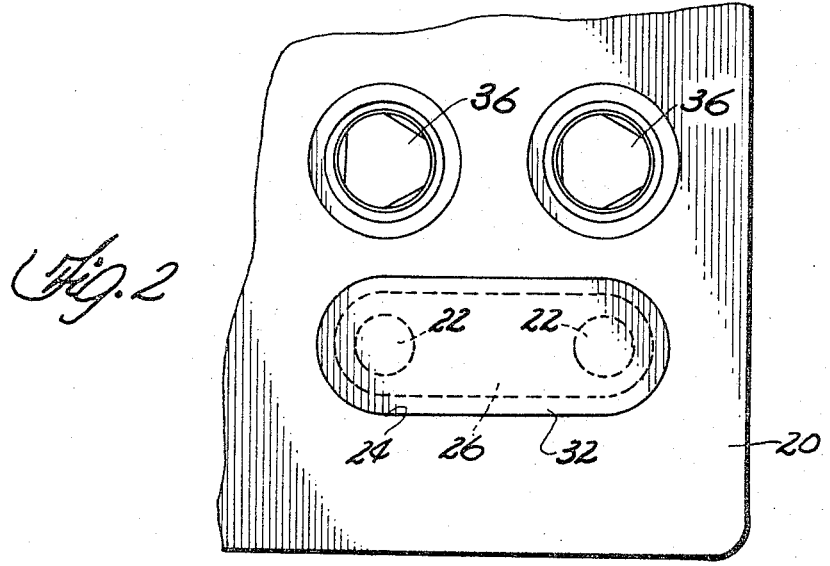
INVENTOR.
Anthony Sabatino
BY Pendleton, Neuman,
Seibold & Williams
Attorneys

United States Patent Office 3,311,509
Patented Mar. 28, 1967

3,311,509
METHOD OF SEALING INTERCELL BATTERY CONNECTIONS
Anthony Sabatino, Milwaukee, Wis., assignor to Globe-Union Inc., Milwaukee, Wis., a corporation of Delaware
Filed May 28, 1964, Ser. No. 370,892
3 Claims. (Cl. 136—134)

This invention relates to storage batteries and more particularly to an improved sealed terminal assembly for a storage battery and an improved method of manufacture thereof.

Battery constructions have heretofore been proposed employing one-piece covers with wells formed in the outer surface thereof to accommodate the various electrical connections. Each well is provided with two apertures, one opening into each of two adjacent battery cell compartments. Electrode assemblies are disposed in their respective cell compartments, and each electrode assembly has two terminal posts which extend upwardly through their respective apertures in the cover. The present practice has been to interconnect the cells by means of links which are disposed on the outer ends of the terminal posts and within the associated well. The link is then fused or burned into intimate physical and electrical contact with the posts and the construction is electrically complete.

However, it is generally desirable to cover and conceal the terminal posts and links to minimize the hazards of short circuits, reduce exposed lead parts, and reduce the reaction of the exposed lead with spilled battery fluid, acid vapors, or entrained acid in the atmosphere. It has therefore been proposed to add a plastic material to the link well to accomplish the foregoing desiderata. The material employed has been that which is generally known as "battery compound" from the art of battery manufacture prior to the advent of one-piece covers. Battery compounds are generally asphaltic or rubber-based compounds which flow freely at elevated temperatures and retain a modicum of plasticity at ambient temperatures. They are poor adhesives and tend to crack and flow even at low temperatures.

The foregoing constructions have not proven wholly satisfactory because of the recited characteristics of battery compounds. Furthermore, it has been found that a quantity of air is frequently entrapped around the terminal posts, and under the link member, and when the hot compound is poured into the link well, this air expands and produces bubbles and blisters on the surface. The present invention substantially prevents the formation of such blisters.

Moreover, in former battery constructions it has been necessary to surround the terminal post with a bushing at the place where the terminal post passes through the aperture in the cover in order to get an adequate fluid seal between the interior and exterior of the battery. This bushing is customarily formed of rubber or lead and represents an item of cost in battery manufacture. The present invention eliminates the need for this bushing and accomplishes the same results with a simplified and less expensive construction.

Accordingly, it is a principal object of the present invention to provide a means for sealing cell posts and a connecting link within a link well in a one-piece cover battery construction, by which the aforesaid advantages may be attained.

Another object of the present invention is to provide an adequate fluid seal between the interior and exterior of the battery without the need for bushings surrounding the terminal posts where they pass through portions of the cover.

These and other objects of the present invention will become manifest upon an examination of this description and the accompanying claims and drawing.

In one embodiment of the present invention, there is provided an improved battery terminal seal and a method of sealing a link well in which the terminal post apertures in the cover are made to closely fit the terminal posts themselves, and a small quantity of setting material such as epoxy or the like is poured into the link well prior to filling the well with battery compound. The epoxy makes an excellent seal between the post and the cover and between the link and the cover and drives out or locks in any entrapped air which may be present in the link well. Thereby, the air cannot expand when the molten battery compound is poured into the link well and bubbles or the like in the finished product are avoided.

Reference will now be made to the accompanying drawing, in which:

FIG. 1 is a partial cross-sectional view of a portion of a battery constructed in accordance with the present invention; and FIG. 2 is a partial plan view of the battery of FIG. 1.

The upper portions of two adjacent cells 10 and 12 are illustrated in FIG. 1, each containing an electrode assembly 14. The cells 10 and 12 are defined by a casing body having a closed end, peripheral walls 16 and intermediate walls 16a. The upper edges of the walls 16 and 16a are received in grooves 18 and 18a extending transversely from the generally planar surface of a cover 20. The walls 16 and 16a are preferably sealed to the grooves 18 and 18a respectively with appropriate cement means 17.

Each electrode assembly 14 has a terminal post 22 which passes through the cover 20. The cover 20 includes a plurality of transversely extending sleeves 27, each provided with central, substantially cylindrical apertures 28. Each adjacent pair of apertures 28 open into a link well 24 formed in the outer surface of the cover 20. The terminal posts 22 of the cells 10 and 12 are electrically interconnected by a link 26 which rests within the link well 24. The posts 22 and the link 26 are preferably formed of lead and are welded or "burned in" to insure a strong mechanical and electrical connection between them. The link 26 preferably rests against the bottom surface of well 24 and is juxtaposed thereto. However, as a result of surface discontinuities and the like, a space, usually of capillary dimension, will remain.

The apertures 28 in sleeves 27 have a diameter between about .030″ less than the diameter of the posts 22 and about .030″ greater than that diameter, and are preferably between about .005″ and about .015″ less than the diameter of the posts 22. The battery cover 20 is preferably formed of a copolymer plastic, a rubber compound, or a combination thereof and has some resiliency. Thus, the sleeves 27 expand slightly as the posts 22 are pushed through the apertures 28 in the preferred form of the invention. Each of the apertures 28 has an outwardly flared extremity 29 with a funnel-like shape at its lower end to facilitate the insertion of the posts 22.

When the posts 22 have been welded to the link member 26, a small amount of a low viscosity setting material 30 such as epoxy resin or the like is poured into the link well 24 adjacent the link 26. The epoxy is made very fluid, having a viscosity of between about 500 and about 5000 centipoises. The viscosity is preferably about 1000 cps. at 75° F. The fluidity of the epoxy 30 is controlled within this range to insure flow under the link member 26 and to surround the terminal posts 22 where they emerge into the link well 24 and pass through sleeves 27. Any spaces between the posts 22 and the sides of the apertures 28 have dimensions such that the epoxy also runs into the spaces and forms a seal. The parts have been somewhat exaggerated in the drawing to more clearly indicate the epoxy film 30a which forms in the interstical spaces between the link 26 and the well 24 and the film 30b which forms in the small, generally cylindrical space between the post 22 and the sleeve 27.

The epoxy is then permitted to set, and this occurs very quickly when the epoxy is poured into the link well just after the link member 26 has been welded to the terminal posts 22 and the elements are still hot. It is preferable, therefore, that the epoxy be poured into the link well 24 immediately after the welding step. When the epoxy 30 sets, it forms a seal and an effective bushing. A battery compound 32, preferably one of the asphaltic compounds heretofore known, is thereafter poured into the link well 24 to raise the outer surface thereof substantially to the surface of the cover 20. The compound completely conceals and protects the posts 22 and the link 26. The compound is of the type which remains somewhat plastic or pliable even at ambient temperatures, although the compound is applied to the well at elevated temperatures and under more fluid conditions. Any air remaining in the bottom of the link well or within the joint is entrapped, and cannot deleteriously affect the homogeneity of the battery compound 32 poured on top of it. Accordingly, there are no bubbles or blisters in the battery compound 32, and its upper surface is flush with the remainder of the cover 20.

Although only a portion of a battery is illustrated in FIG. 1, it will be understood that the battery may have a plurality of additional cells, in which case the adjacent cells have respective posts 22 extending outwardly into a link well and a link 26 interconnecting the posts. The arrangement is the same as has been described. It is understood that the electrode assemblies 14 each have two terminal posts 22, one at each end of the cell, and a pair of links 26 connect the two posts 22 to adjacent cells on opposite sides. The endmost cells each have one post 22 which is not connected to a link 26, but is instead connected to an exterior terminal post. One such exterior post 34 is illustrated in the background of FIG. 1. In addition, each of the cells of the battery is provided with a removable cap 36 covering an aperture through which the cell is vented, the level of electrolyte in each cell may be inspected, and fluid added if necessary.

From the foregoing, the present invention has been described with such particularity as to enable others skilled in the art to make and use the same, and, by applying current knowledge, to adapt the same for use under varying conditions of service, without departing from the essential items of novelty involved, which are intended to be defined and secured by the appended claims.

What is claimed is:

1. A method of sealing the terminal portions of an electrolytic storage battery to the casing thereof comprising the steps of placing a terminal portion in a close fitting relationship with a casing portion, applying a low viscosity epoxy cement to said closely fitting terminal portion and casing portion by pouring the cement onto said casing adjacent said casing portion, whereby said cement is drawn therebetween, causing said cement to set and bond said terminal portion to said casing portion, applying molten battery compound to surround said terminal portion and said casing portion and form a smooth surface with said casing, and causing said battery compound to set.

2. A method of forming a sealed intercell connection in an electrolytic storage battery where terminal portions extend outwardly from said battery through a casing comprising the steps of securing a conductive link between adjacent terminal portions so that said link is in closely fitting relationship with a casing portion, applying a low viscosity epoxy cement to said closely fitting link and said casing portion by pouring the cement onto said casing adjacent said casing portion, whereby said cement is drawn therebetween, causing said cement to set and bond said link to said casing portion, applying molten battery compound to surround said terminal portions and said casing portion and form a smooth surface with said casing, and causing said battery compound to set.

3. A method of forming a sealed intercell connection in an electrolytic storage battery where the battery has a cover with a well disposed therein and each electrode assembly has an outwardly extending terminal, said method comprising forming a pair of apertures in said link well having a diameter slightly smaller than the diameter of said terminal, inserting one terminal of each of two adjacent electrode assemblies through said aperture with an interference fit, securing a conductive link between said terminals whereby said link is in closely fitting relationship with said link well, applying a low viscosity epoxy cement to said link and link well by pouring the cement into said link well, whereby said cement is drawn therebetween, causing said cement to set and bond said link to said link well, applying molten battery compound to fill said well and form a smooth surface with said cover, and causing said battery compound to set.

References Cited by the Examiner

UNITED STATES PATENTS

| | | | |
|---|---|---|---|
| 1,782,984 | 11/1930 | Carlile | 136—134 X |
| 2,391,820 | 12/1945 | Daily | 136—134 X |
| 2,892,006 | 6/1959 | Belove | 136—168 |
| 3,064,068 | 11/1962 | Fouch | 136—168 |
| 3,223,558 | 12/1965 | Purcell | 136—168 |

WINSTON A. DOUGLAS, *Primary Examiner.*

D. L. WALTON, *Assistant Examiner.*